United States Patent [19]
Farrell

[11] Patent Number: 5,452,068
[45] Date of Patent: Sep. 19, 1995

[54] APPARATUS AND METHOD FOR REDUCING PRODUCTIVITY LOSSES IN A MARKING ENGINE

[75] Inventor: Michael E. Farrell, Ontario, N.Y.

[73] Assignee: Xerox Corporation, Stamford, Conn.

[21] Appl. No.: 251,763

[22] Filed: May 31, 1994

[51] Int. Cl.[6] .................................. G03G 21/00
[52] U.S. Cl. ............................... 355/321; 355/308
[58] Field of Search ............... 355/321, 204, 322, 323, 355/324, 308

[56] References Cited

U.S. PATENT DOCUMENTS

| | | | |
|---|---|---|---|
| 4,782,363 | 11/1988 | Britt et al. | 355/14 |
| 5,095,342 | 3/1992 | Farrell et al. | 355/319 |
| 5,159,395 | 10/1992 | Farrell et al. | 355/319 |
| 5,206,735 | 4/1993 | Gauronski et al. | 355/313 X |

OTHER PUBLICATIONS

David W. Covert, "Throughput Increase of Simplex-Duplex Intermix Jobs", *Xerox Disclosure Journal*, vol. 18, No. 4, Jul./Aug. 1993, pp. 431–433.

*Primary Examiner*—R. L. Moses
*Attorney, Agent, or Firm*—Gary B. Cohen

[57] ABSTRACT

A method is provided for producing prints in a printing machine having a marking engine operatively coupled with a finishing device, which finishing device normally requires productivity losses in the marking engine. The method includes the steps of: a) storing a first print job and a second print job; b) printing a first portion of the first print job; c) transmitting the printed first portion of the first print job to the finishing device; d) performing a finishing operation, at the finishing device, on the printed first portion of the first print job; e) during the step d), printing a portion of the second print job; f) transmitting the printed portion of the second print job to a print output area, the print output area being separate from the finishing device; and g) initiating printing of a second portion of the first print job, concurrent with step d), for reducing productivity losses in the marking engine.

20 Claims, 14 Drawing Sheets

FIG. 9

APPARATUS AND METHOD FOR REDUCING PRODUCTIVITY LOSSES IN A MARKING ENGINE

The present invention relates generally to a technique for processing print jobs and, more particularly, to an apparatus and method for printing a first job, scheduled for delivery to a first destination and a second job, scheduled for delivery to a second destination, in a manner that reduces productivity losses in a marking engine.

The terminology "copiers", and "copies", as well as "printers" and "prints", is used alternatively herein. The terminology "imaging" and "marking" is used alternatively herein and refers to the entire process of putting an image (digital or analog source) onto paper. The image can then be permanently fixed to the paper by fusing, drying, or other means. It will be appreciated that the invention may apply to almost any system in which the images are made electronically, including electronic copiers.

Imaging systems (e.g., printers or copiers) typically include copy sheet paper paths through which copy sheets (e.g., plain paper) which are to receive an image are conveyed and imaged. The process of inserting copy sheets into the copy sheet paper path and controlling the movement of the copy sheets through the paper path to receive an image on one or both sides, is referred to as "scheduling". Copy sheets are printed by being passed through a copy sheet paper path (which includes a marking station) one or multiple times. Copy sheets which are printed on only one side (simplex copy sheets) in a single color usually pass through the copy sheet paper path a single time. Multipass printing is used to print images on both sides of a copy sheet (duplex printing), or to print a simplex sheet in multiple colors (one pass for each color). There are two general modes in which copy sheets to be multipass printed can be scheduled: "burst mode" and "interleave mode".

When scheduling in "burst mode", copy sheets are inserted into, imaged, and output from the copy sheet paper path without any "skipped pitches" existing between each consecutive copy sheet. A "pitch" is the portion (or length) of the copy sheet paper path in the process direction which is occupied by a copy sheet as it moves through the copy sheet paper path. A "skipped pitch" occurs when there is a space between two consecutively output copy sheets which is long enough to hold another copy sheet. Accordingly, when scheduling in "burst mode", copy sheets are output from the copy sheet paper path (and, thus, the imaging system) at a maximum rate because no skipped pitches exist between each consecutive copy sheet.

Various methods for scheduling copy sheets in "burst mode" are disclosed in, for example, U.S. Pat. No. 5,095,342 to Farrell et al., the pertinent portions of which are incorporated herein by reference.

When scheduling copy sheets in "interleave mode", skipped pitches are provided between each consecutively scheduled copy sheet. That is, a space is provided between each copy sheet inserted into and output from the copy sheet paper path. While other copy sheets may be eventually inserted in the space between two consecutively input sheets, these other sheets are inserted at a later time (described below) and are thus "interleaved" with the previously inserted copy sheets.

This "interleave mode" of copy sheet scheduling is typically employed in imaging systems which are capable of duplex printing (forming images on both sides of a copy sheet). Many imaging systems which are capable of duplex printing include copy sheet paper paths in the shape of a loop. The scheduling process involves: a) inserting a copy sheet into the loop; b) forming an image on a first side of the copy sheet at an imaging station; c) inverting the copy sheet (so that a second side of the copy sheet will face the imaging station when the copy sheet is reconveyed past the imaging station); d) forming an image on the second side of the copy sheet at the imaging station; and e) outputting the copy sheet from the paper path loop toward a final destination (a tray, a bindexer, finishing devices, etc.).

One reason why the "interleave mode" of scheduling is frequently used when duplex printing relates to the manner in which the original images are provided to the imaging station. For example, when the imaging system is using a recirculating document handler (RDH) to cycle a simplex document over a platen for exposure to a light source for forming duplex copies of the document, the imaging system exposes every other sheet in the simplex document so that a duplex copy of the document can be formed. For example, all even numbered pages in the document are exposed first to form a copy set consisting of copy sheets having even numbered pages on one side. Then, the odd numbered pages in the document are exposed, and these odd numbered pages are formed on the second side of the copy sheets containing the even numbered pages on side ode.

The Xerox Corporation "9700" printer, duplex version schedules duplex copy sheets in an interleave mode of operation. It operates in essentially a trayless mode, with a long duplex loop path. Initially, prints (copies) of only the even sides are made, with one skip cycle (skipped pitch) between each print until the entire paper path is filled with even side prints alternated with skipped pitches. When the first completed even side (page 2) reaches the transfer area for the second side print (page 1), that page is printed on the back side. The next print to be made, however, is the next even side in the sequence printed on a blank sheet, and interleaved in the blank spaces (previously skipped pitches) left between sheets on the first pass. Thus, the job then proceeds at full productivity, intermixing (or interleaving) even sides printed on blank sheets for the first pass with odd sides printed on the back of previously completed even sides on their second pass. After the last even side is printed, the system resumes the skip pitch operation until the odd sides are printed on the last of the even side prints.

For a 30 page job, this "9700" printer duplex version page copying sequence can be represented as shown below. [Each "S" represents a skipped pitch. Previously printed sheet pages making their second pass for their second side copy are shown under the slash.]

First stage-[evens copied+skips=half productivity]:
2, S, 4, S, 6, S, 8;

Second stage-[odds and evens intermixed—full productivity]:
1/2, 10, 3/4, 12, 5/6, 14, 7/8, 16, 9/10, 18, 11/12, 20, 13/14, 22, 15/16, 24, 17/18, 26, 19/20, 28, 21/22, 30;

Third stage-[odds copied+skips=half productivity];
23/24, S, 25/26, S, 27/28, S, 29/30.

Note that with this "9700" printer sequence, 36 machine pitches are required to make 30 prints. So, for this 30 page job, the overall duplex operation is only 83% efficient. For longer jobs, the effective efficiency improves. But for shorter jobs the overall efficiency degrades, since there will still be 6 skipped pitches—"S".

The sequence used on Xerox Corporation "5700" printer is somewhat similar, except that it is not a trayless duplex loop system. All the completed first side sheets are stacked into a duplex buffer tray and later refed for side two printing. With this system, printer skip pitches are not required during the first stage of the job. The skip pitches are also not required for the third stage since the completed side ones can be fed at full thruput from the duplex tray. Thus, the "5700" duplexing is much more efficient than in the "9700". However, such duplex tray systems are inherently less reliable in some respects. The required duplex tray stacking, reseparating, and refeeding is implicated in the vast majority of duplex paper jams, and complicates job recovery. That is eliminated with the "9700" and other endless moving path duplex buffer loop systems.

Other conventional sequences for printers are also possible. For example, the Hewlett Packard HP "2000" uses a stack and re-feed method of duplex in which all even sides of the entire job are printed, followed by printing all of the odd sides. However, for this, the entire job (all the page images) must be stored in memory in order to insure jam recovery.

It is generally known that electronically inputted printers can desirably provide more flexibility in page sequencing (page, copying presentation order) than copiers with physical document sheet input. The printer input is electronically manipulatable electronic page media, rather than physical sheets of paper which are much more difficult to reorder or manipulate into a desired sequence. As also shown in the art noted hereinbelow, it is generally known that certain such reordered or hybrid document page copying orders or sequences may be copied onto a corresponding sequential train of copy sheets in an appropriate copier or printer to provide higher copying machine productivity yet correct page order copy output, especially for duplex copies made with a copier with trayless duplexing, i.e., providing a limited length endless buffer loop duplexing path for the copy sheets being duplexed.

Thus, electronically inputted imaging systems can operate in "burst mode" even when forming duplex copy sets. When operating in burst mode in an electronically inputted imaging system having an endless buffer loop duplexing paper path (no buffer tray), the duplexing paper path is completely filled with copy sheets (no skipped pitches) which are then imaged on both sides before being output from the duplexing paper path. Duplex burst mode scheduling causes duplex sheets to be output in small bursts of sheets (the duplex loop content) at full rated output.

However, it is becoming increasingly common to integrate on-line finishing devices with imaging systems. These on-line finishing devices directly receive copy sheets as they are output from the imaging system and perform various types of finishing operations on each copy sheet, or on each set of copy sheets. The finishing operations can be, for example: binding, stitching, folding, trimming, aligning, rotating, punching, drilling, slitting, perforating, and combinations thereof.

A problem which arises when integrating an existing finishing device with high speed imaging systems is that the finishing device may not be able to receive copy sheets at as high a frequency as the copy sheets can be output by the imaging system. For example, the imaging system described in U.S. Pat. No. 5,095,342 can output copy sheets at a rate of 135 per minute when operating in "burst mode". This rate is too fast for some finishing devices.

One example involves the use of the imaging system disclosed in U.S. Pat. No. 5,095,342 in connection with an on-line Signature Booklet Maker (SBM) to form signature booklets. A "signature" is a duplex printed copy sheet having two page images on each side. The signature sheet can be folded in half to form a booklet, or a plurality of signatures can be aligned, stitched together, and folded in half to form a multi-sheet booklet. Descriptions of signature printing are provided in U.S. Pat. No. 4,727,042 to Smith and U.S. Pat. No. 5,271,065 to Rourke et al., the pertinent portions of which are incorporated herein by reference. The imaging system disclosed in U.S. Pat. No. 5,095,342 is capable of outputting signatures in bursts at a rate of 135 per minute, but the SBM may not be able to receive sheets at such a high rate.

A sheet scheduling approach that compensates for the disparity in sheet handling capabilities of the imaging system and a finishing device, such as the SBM, is disclosed in U.S. Pat. No. 5,159,395 to Farrell et al., the pertinent portions of which are incorporated herein by reference. In particular, U.S. Pat. No. 5,159,395 discloses a printing system that operates in one of two modes, depending on whether sheets are being delivered to the SBM. In the first mode, printed copy sheets are output from a copy sheet path of the printing system without any skipped pitches. The first mode of scheduling provides the maximum output (and thus productivity) of the printing system. If, however, the output frequency of the first mode is too great for the finishing device, a second, slower mode of operation results. In the second mode of operation, sheets are output from the printing system with skipped pitches located between at least some of the consecutively output sheets.

Another approach which compensates for the disparity in sheet handling capabilities of the imaging system and a finishing device is disclosed in U.S. Pat. No. 4,782,363 to Britt et al. The system of U.S. Pat. No. 4,782,363 comprises a collating and finishing apparatus and method including a buffered design to allow more time to finish a copy set without halting copying. In a pre-collation copying mode, two bins at a time are utilized as the buffer for compiling while one or two other bins are awaiting being emptied for finishing, and then they function as the buffer for the next two copy sets, etc. A key feature of the system, which enhances productivity, is the sequential use of different pairs of three compiler bins in coordination with finishing so that while the second of one pair of copy sheets is being removed from a bin and finished, the first two sheets of the next sequence or set are entering two other now empty and available bins, in a continuous enter one side/exit the other side sequential operation.

Some examples of other prior art copiers, and especially with control systems therefor, including operator console switch selection inputs, document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270; and 4,475,156. It is well known in this art, and in general, how to program and execute document handler and copier control functions and logic with conventional or simple software instructions for conventional microprocessors in a copier controller. This is taught by the above and other patents and various commercial copiers. Such software may vary depending on the particular function and particular microprocessor or microcomputer system utilized, of course, but will be available to or readily programmable by those skilled in the applicable arts without experimentation, from either descriptions or prior knowledge of the desired functions together with general knowledge in the general software and computer arts. It is also known that conventional or specified document and copy sheet handling functions and controls may be alternatively conventionally provided utilizing various other known or suitable logic or switching systems.

All references cited in this specification, and their references, are incorporated by reference herein where appropriate for appropriate teachings of additional or alternative details, features and/or technical background.

While the approaches of U.S. Pat. No. 4,782,363 and U.S. Pat. No. 5,159,395 enhance printing system productivity, each approach experiences loss of imaging system productivity under certain circumstances. Regarding U.S. Pat. No. 4,782,363, if a pair of bins cannot be emptied out by the time another set is to be delivered, then the imaging system must skip pitches. Regarding U.S. Pat. No. 5,159,395, the printing system operates in a degraded mode, in which pitches must be skipped, when sheets are being delivered to the finishing device. It would be desirable to provide a system in which imaging system productivity is increased, relative to the above-discussed references.

In accordance with a first aspect of the present invention there is provided a printing system with a marking engine, for producing prints, and a finishing device, operatively coupled with the marking engine, for performing a finishing operation on prints produced with the marking engine, which finishing device normally requires productivity losses in the marking engine, including: memory for storing a first print job and a second print job; a print output area, different from the finishing device and operatively coupled with the marking engine, for alternatively receiving prints produced by the marking engine; and a controller, communicating with said memory and the marking engine, for causing a printed first portion of the first print job to be transmitted to the finishing device during a first time interval and a printed portion of the second print job to be transmitted to said print output area during a second time interval, the finishing operation being performed on the printed first portion of the first print job dunng the second time interval and a second portion of the first print job being delivered to the marking engine, during the finishing operation on the printed first portion of the first print job, to reduce productivity losses in the marking engine.

In accordance with a second aspect of the present invention there is provided a method for producing prints in a printing machine having a marking engine operatively coupled with a finishing device, which finishing device normally requires productivity losses in the marking engine, including the steps of: a) storing a first print job and a second print job; b) printing a first portion of the first print job; c) transmitting the printed first portion of the first print job to the finishing device; d) performing a finishing operation, at the finishing device, on the printed first portion of the first print job; e) during said step d), printing a portion of the second print job; f) transmitting the printed portion of the second print job to a print output area, the print output area being separate from the finishing device; and g) initiating printing of a second portion of the first print job, concurrent with step d), for reducing productivity losses in the marking engine.

In one example of the second aspect of the present invention, said step f) of the method includes transmitting the printed portion of the second print job to an output tray or a second finishing device. In yet another example of the second aspect of the present invention, the method further includes the step of determining a delay time defined by a time interval occurring between said step b) and said step g), wherein the printing interval varies as a function of the delay time interval.

In accordance with a third aspect of the present invention there is provided a method for producing prints in a printing machine having a marking engine operatively coupled with a finishing device, which finishing device normally requires productivity loses in the marking engine, comprising the steps of: a) storing a first print job, a second print job and a third print job; b) printing a first portion of the first print job; c) transmitting the printed first portion of the first print job to the finishing device; d) performing a finishing operation, at the finishing device, on the printed first portion of the first print job; e) during said step d), printing a selected one of a portion of the second print job and a portion of the third print job; f) transmitting the selected one of the printed portion of the second print job and the printed portion of the third print job to a print output area, the print output area being separate from the finishing device; and g) initiating printing of a second portion of the first print job, concurrent with step d), for reducing productivity losses in the marking engine.

In one example of the third aspect of the invention said step f) of the method includes transmitting the selected one of the printed portion of the second print job and the printed portion of the third print job to an output tray or a second finishing device.

These and other aspects of the invention will become apparent from the following description, the description being used to illustrate a preferred embodiment of the invention when read in conjunction with the accompanying drawings.

Figure 1:
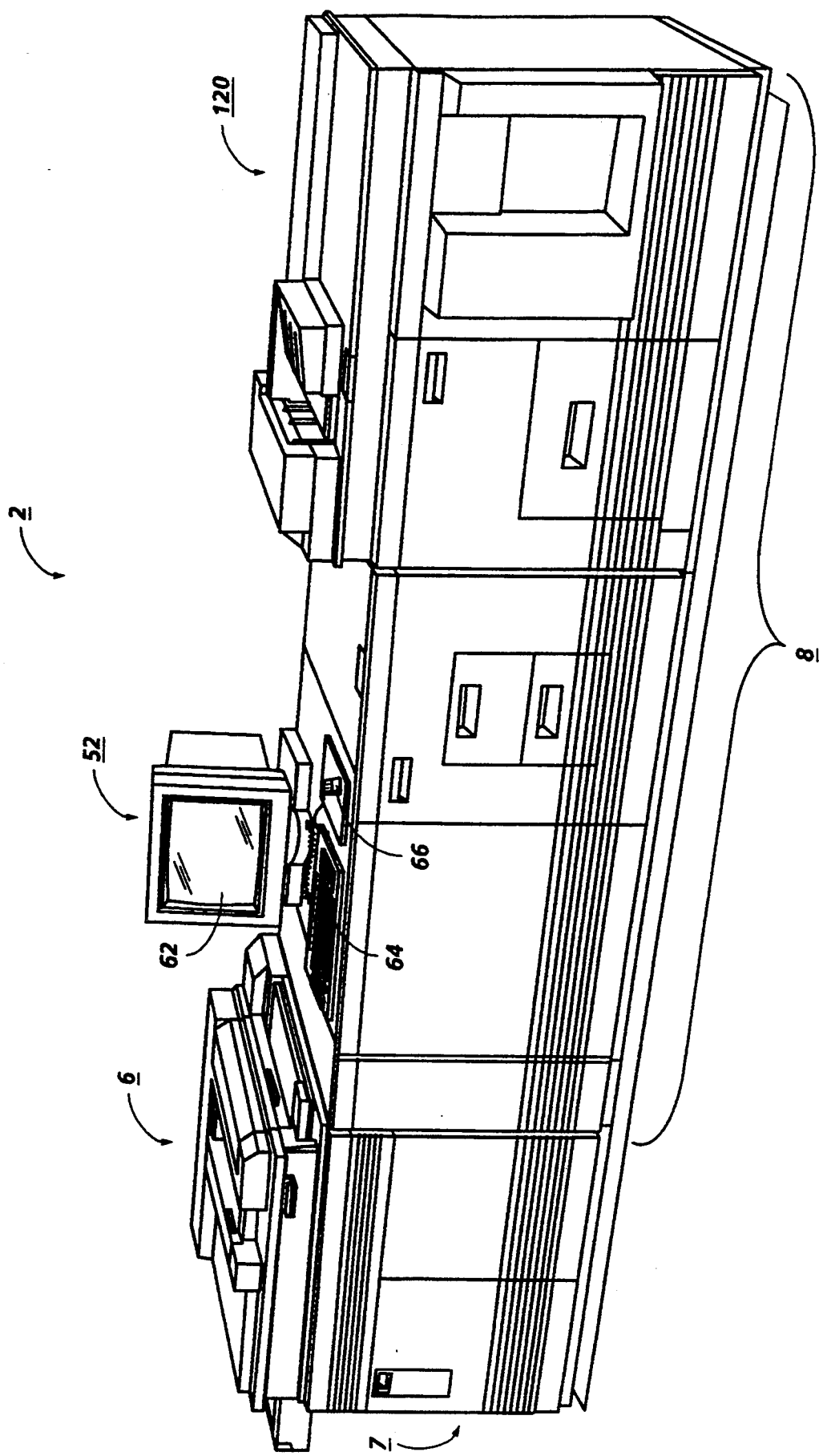
FIG. 1 is a perspective view depicting an electronic printing system.
Figure 3:
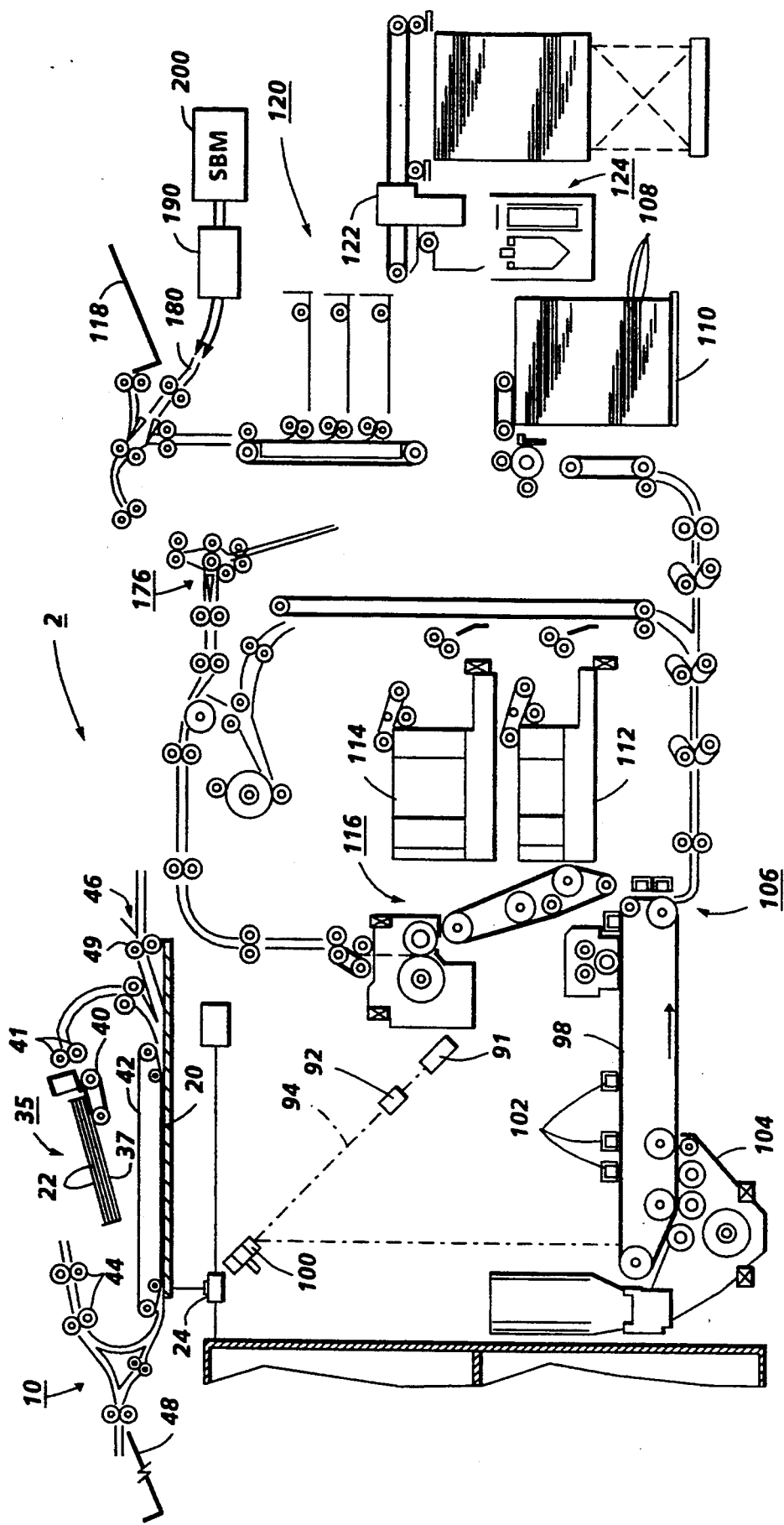
FIG. 3 is an elevational view illustrating the principal mechanical components of the printing system shown in FIG. 1.
Figure 5:
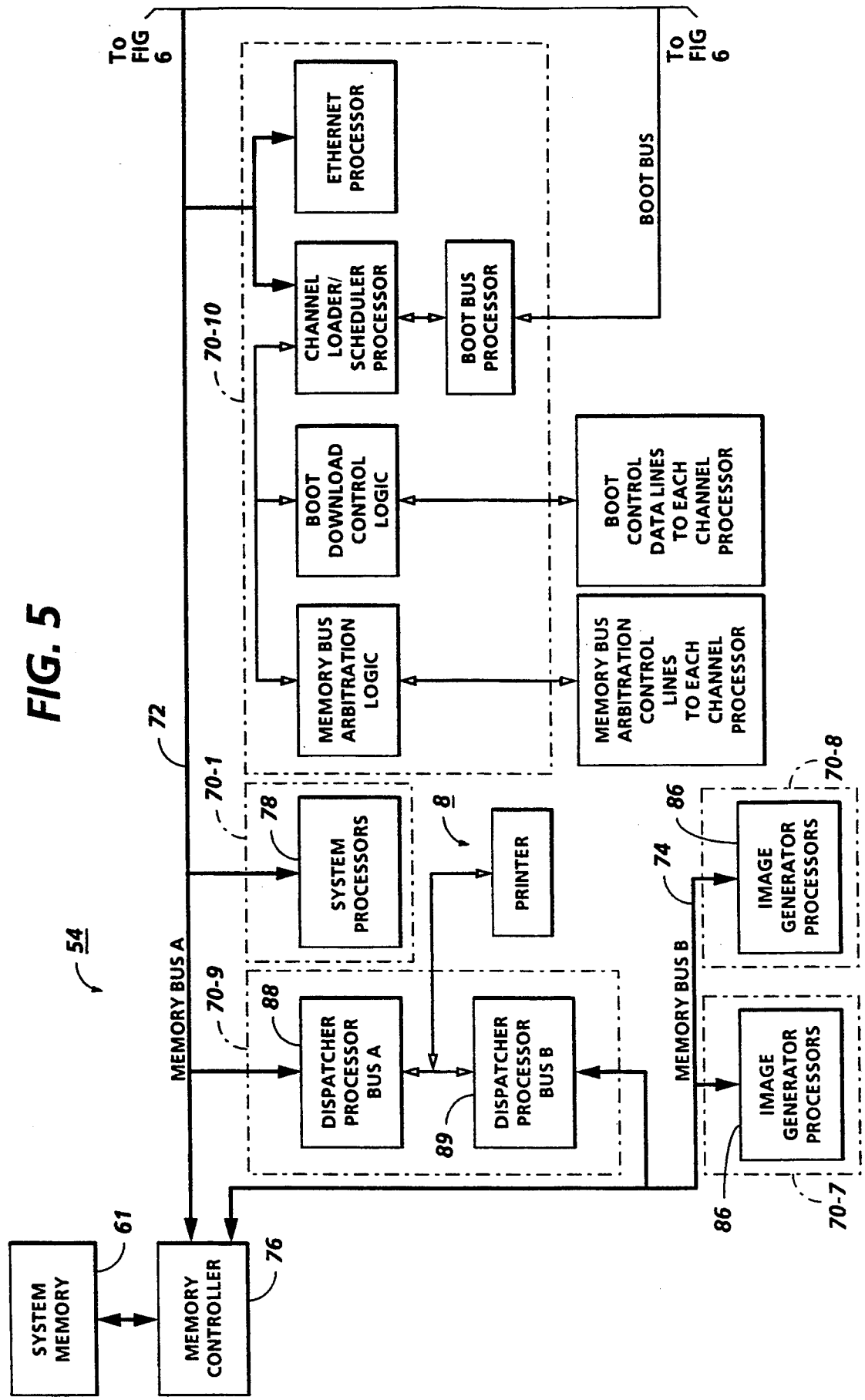
Figure 6:
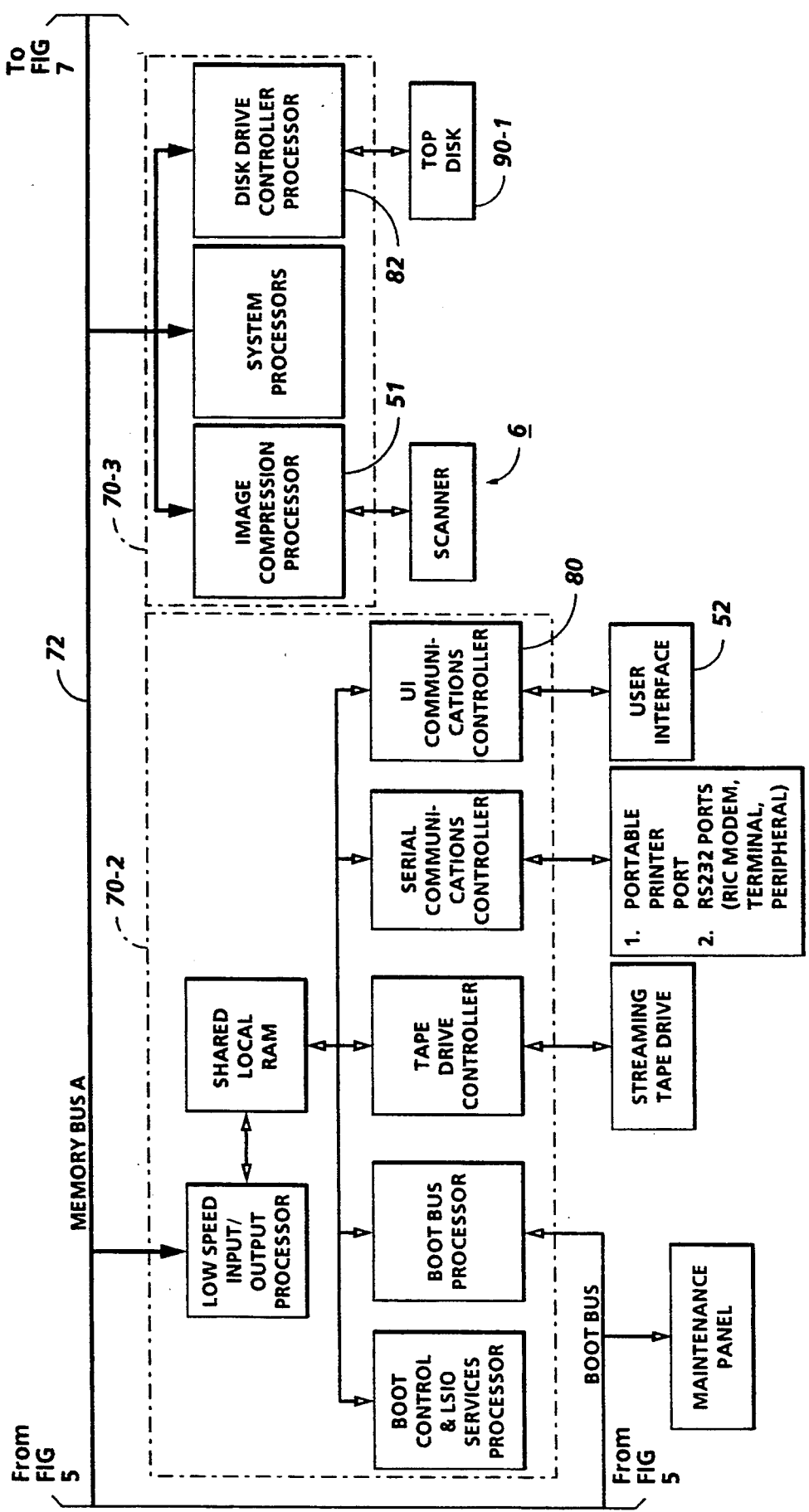
Figure 7:
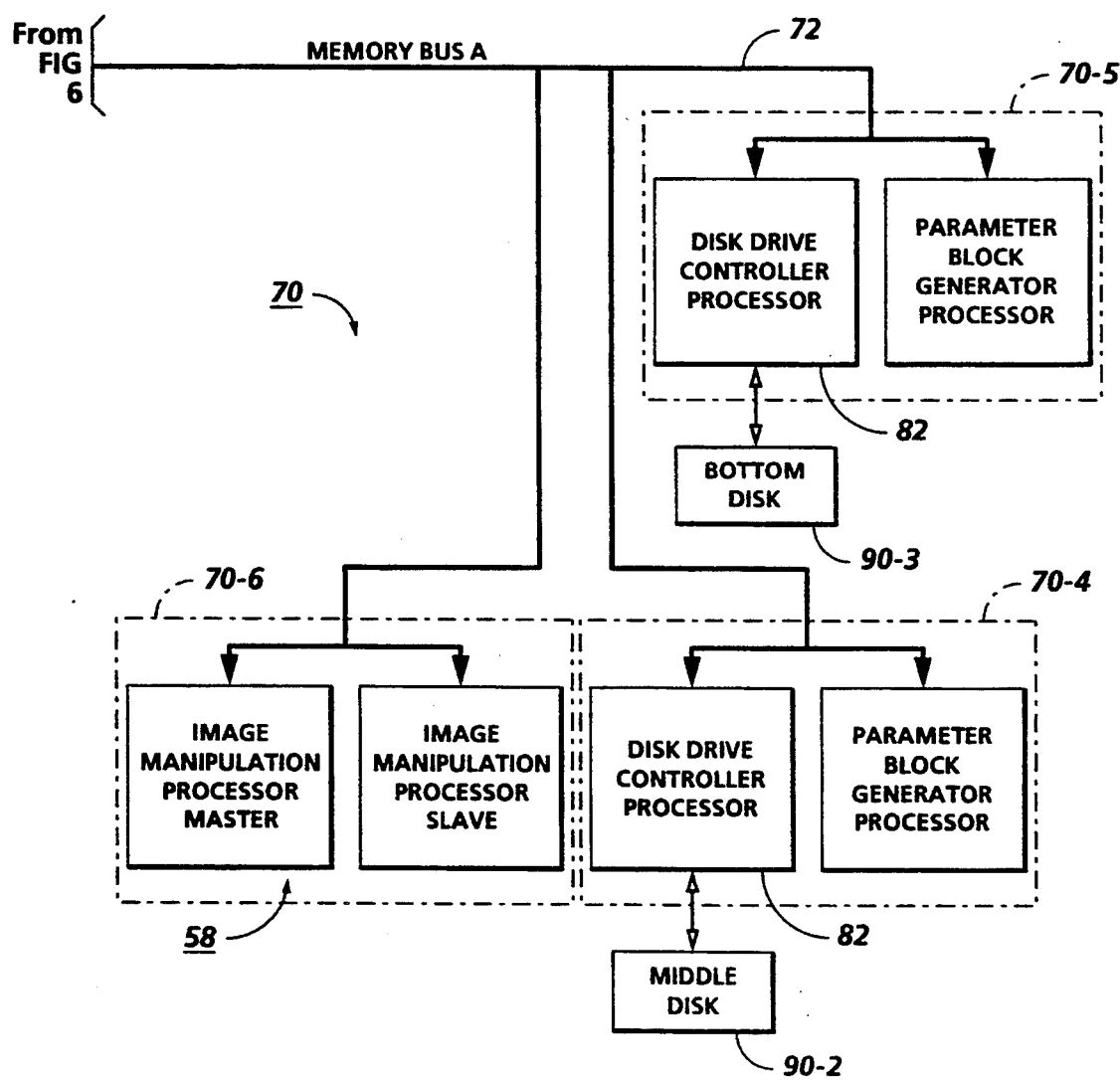
Figure 8:
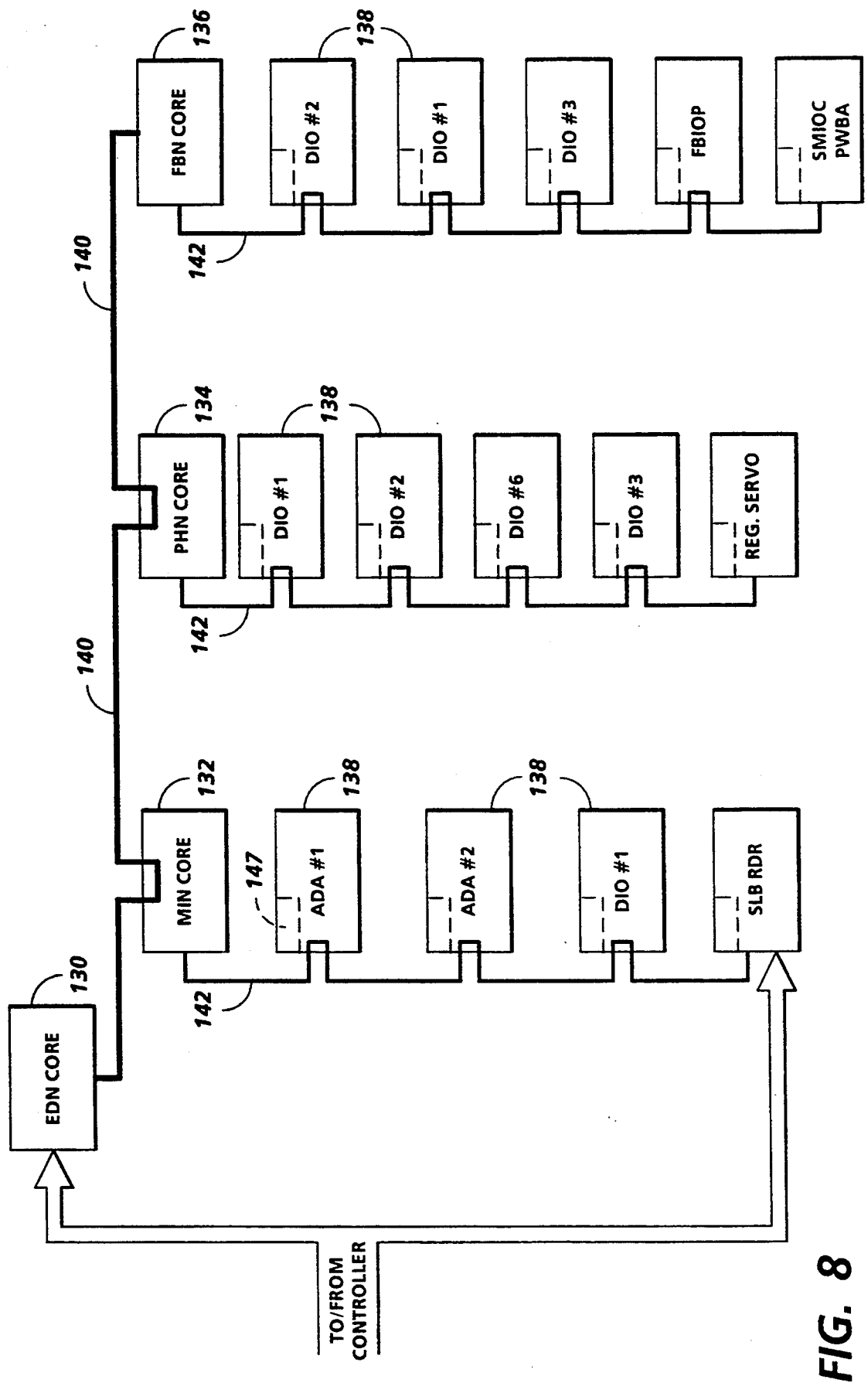
Figure 10:
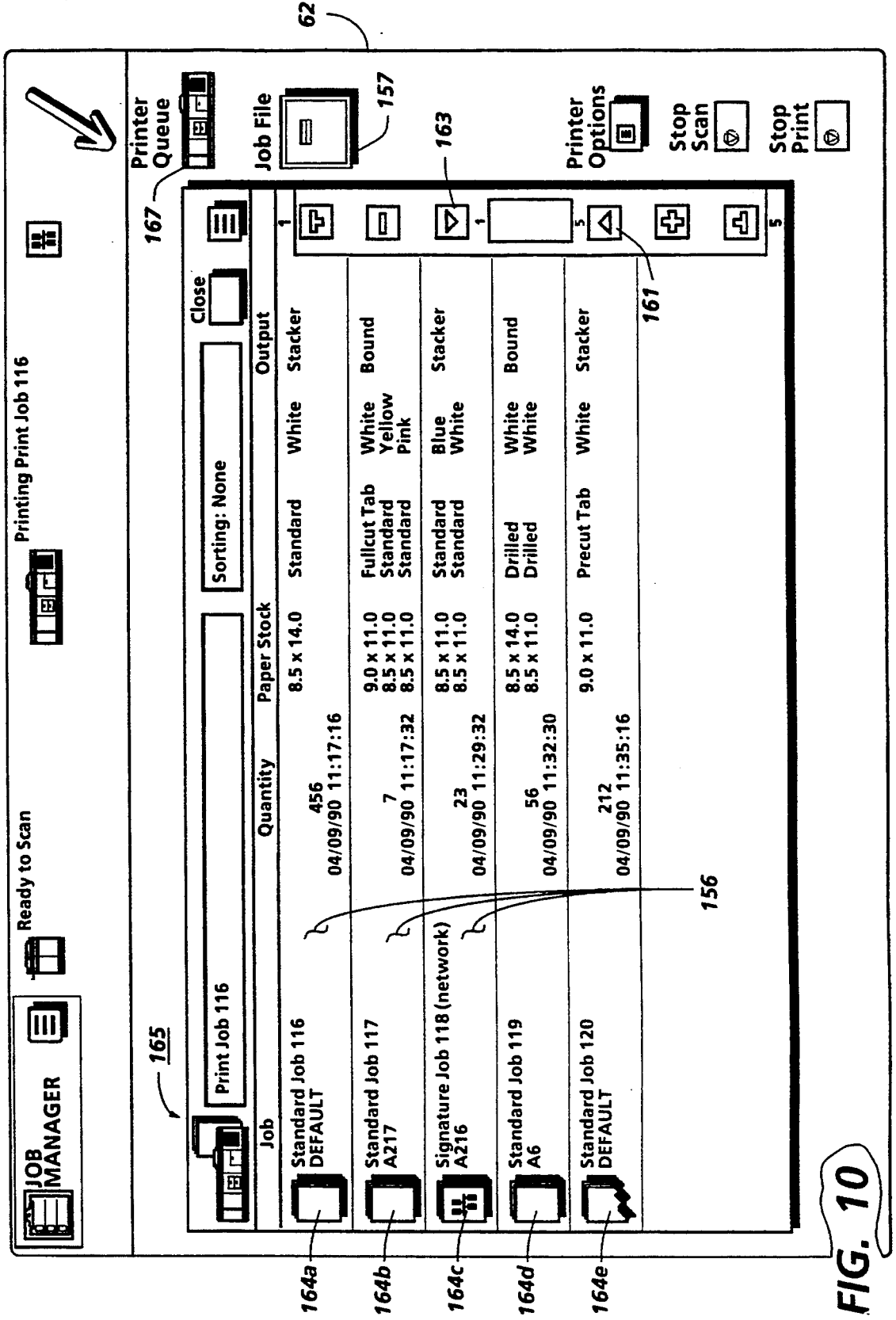
Figure 11:
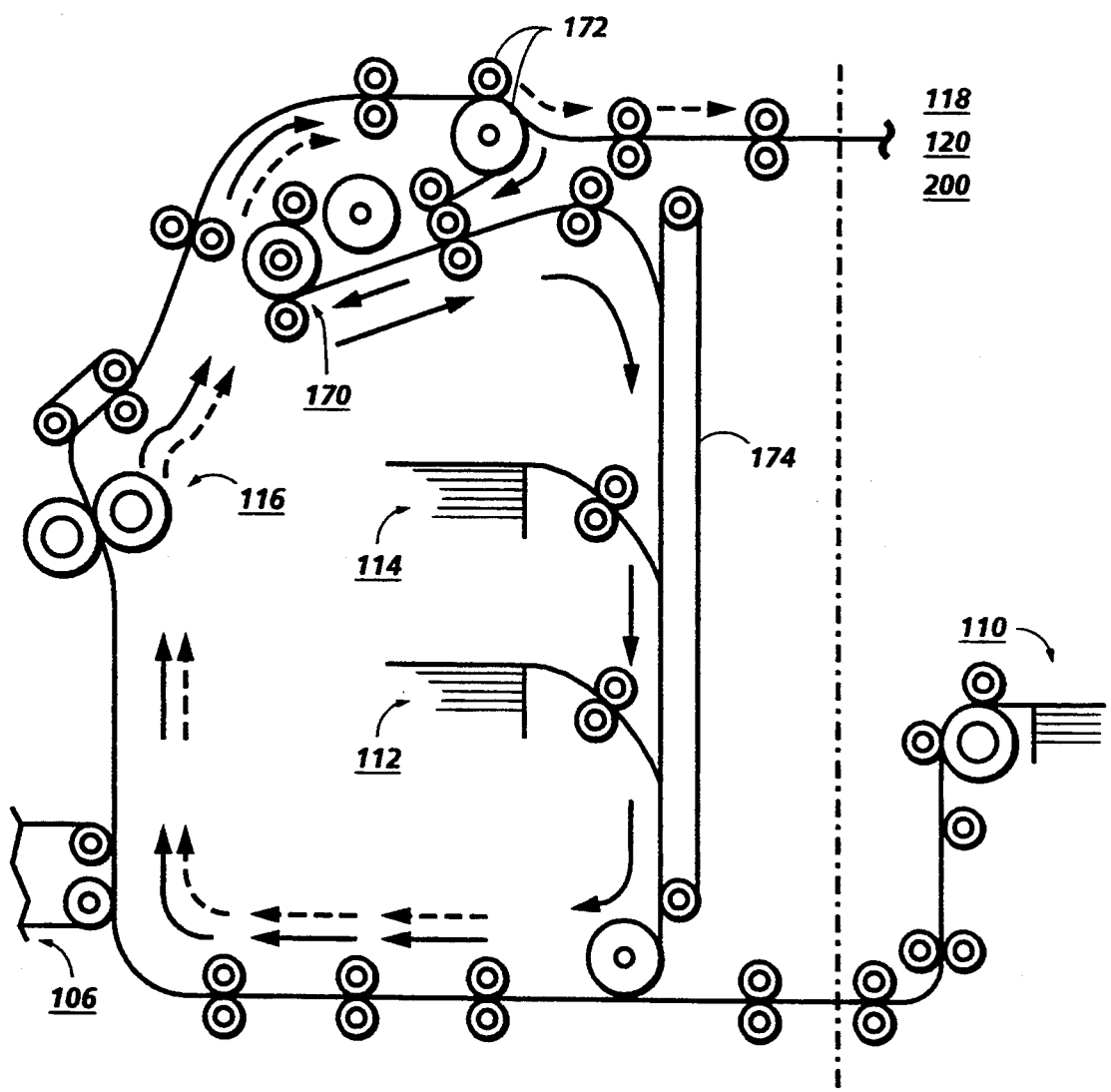
Figure 12:
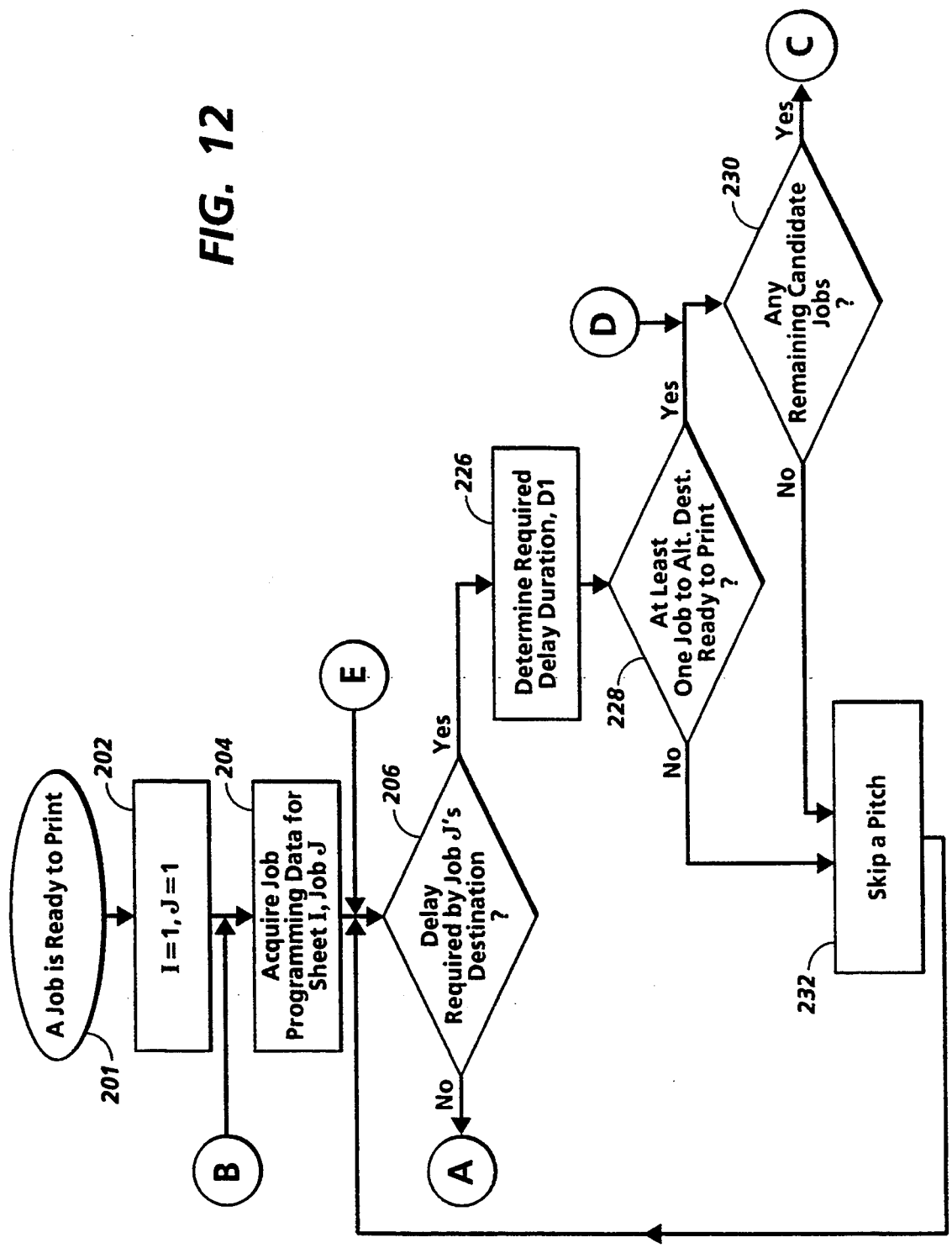
Figure 13:
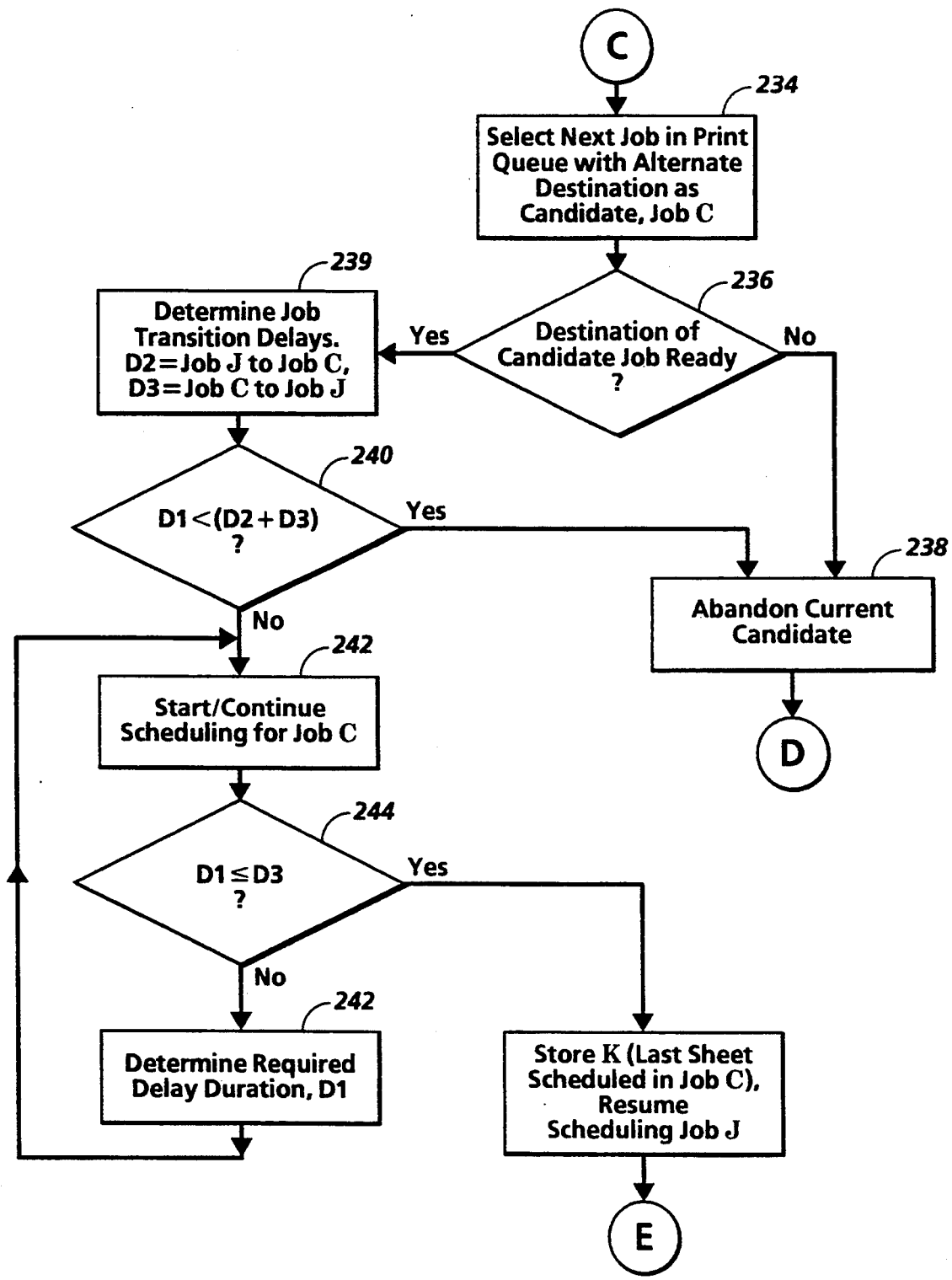
Figure 14:
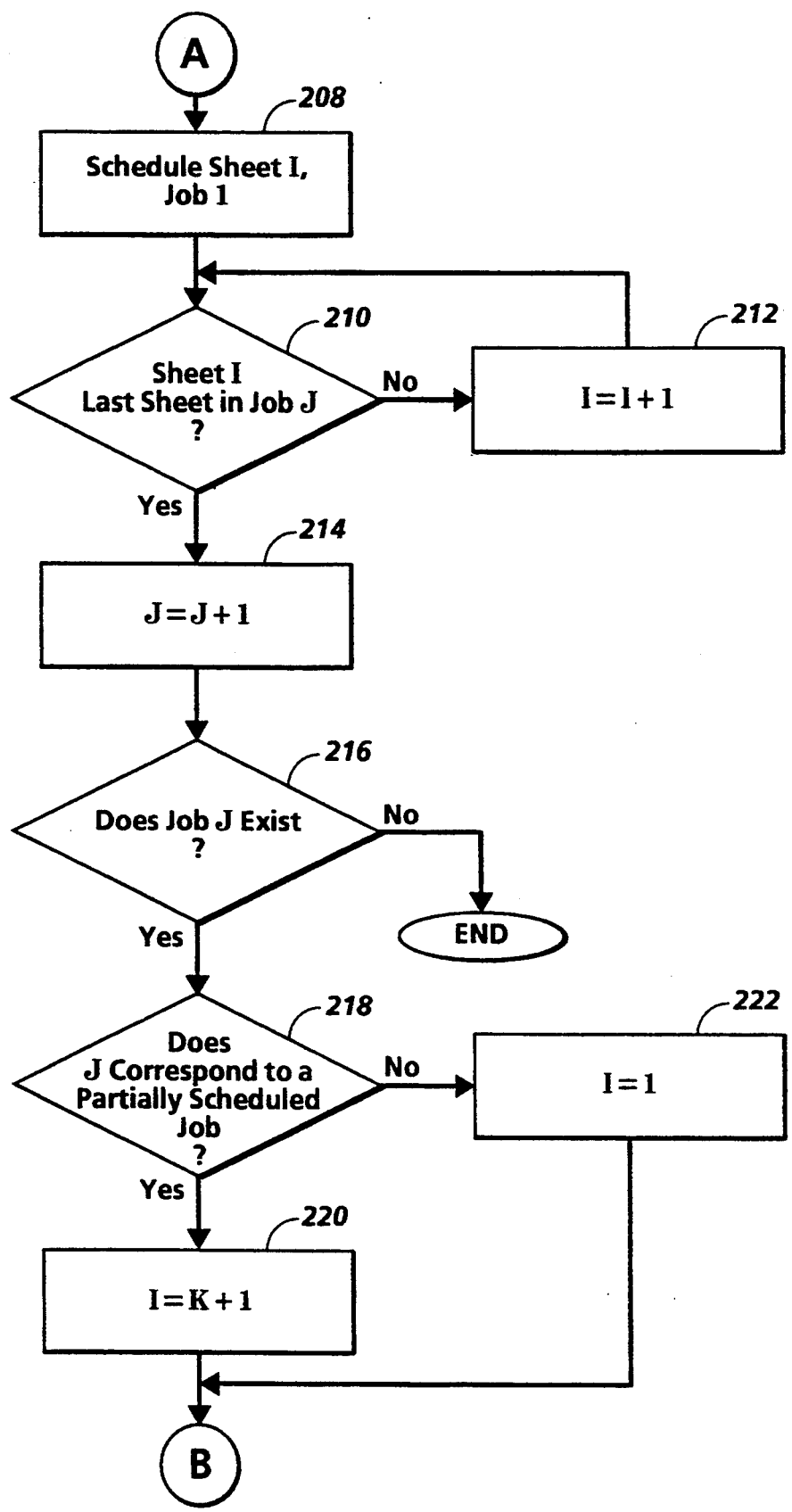

FIGS. 5–7 comprise a schematic block diagram showing the major parts of a control section of the printing system shown in FIG. 1;

FIG. 8 is a block diagram of the Operating System, together with Printed Wiring Boards and shared line connections for the printing system shown in FIG. 1;

Figure 9:
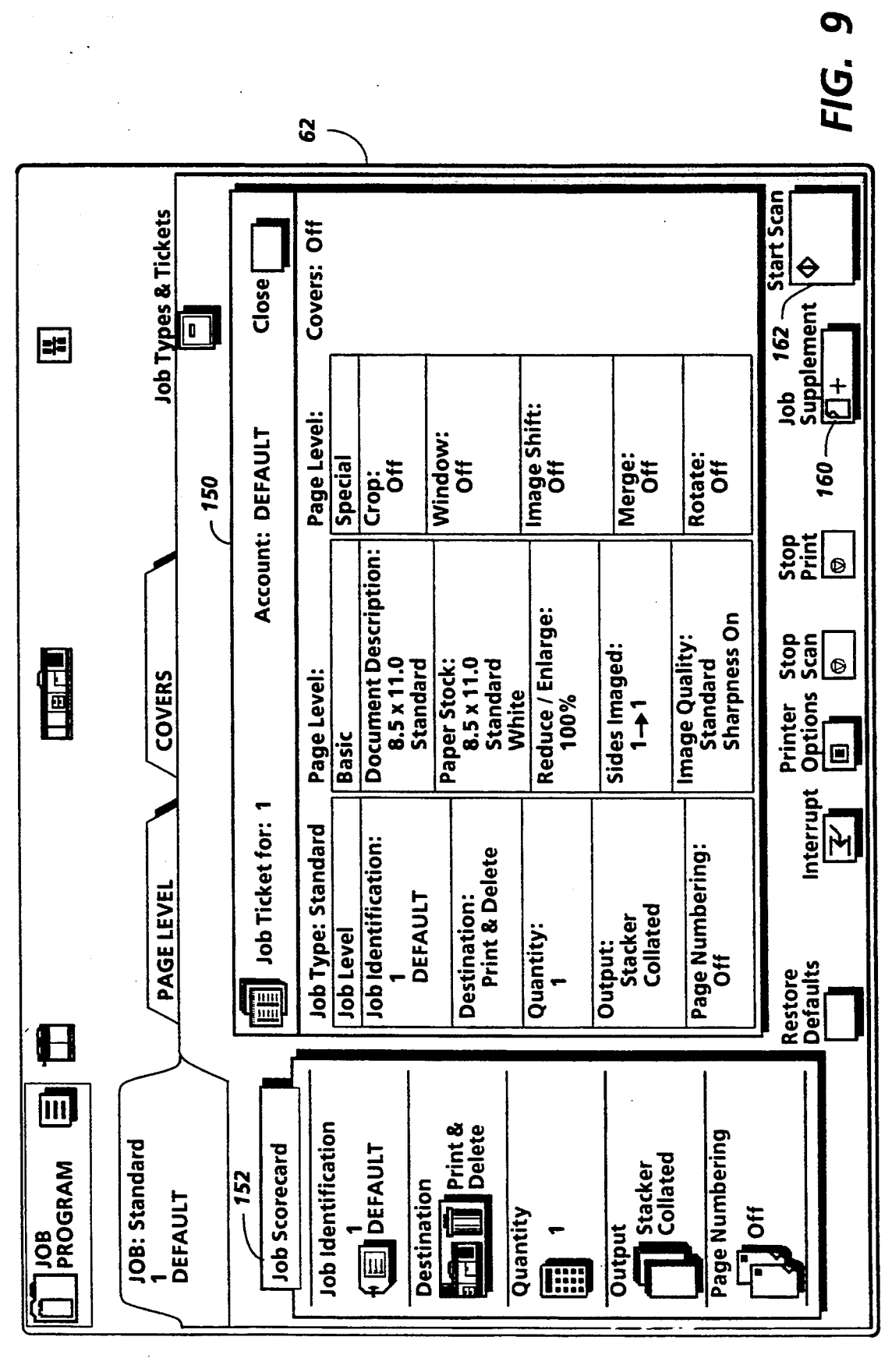

FIG. 9 is an elevational view depicting an exemplary job programming ticket and job scorecard displayed on the User Interface(UI) touchscreen of the printing system shown in FIG. 1;

FIG. 10 is an elevational view of the UI touchscreen depicting a print queue of typical jobs to be printed;

FIG. 11 is a plan view illustrating the duplex and simplex paper paths through which sheets are conveyed through the system of FIG. 3;

FIGS. 12–14 represent a flow chart embodying the steps of an inventive method in which the sheets of a Job C are scheduled to be marked, with a printer of the printing system, during a delay created by an operation being performed on a-Job J.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
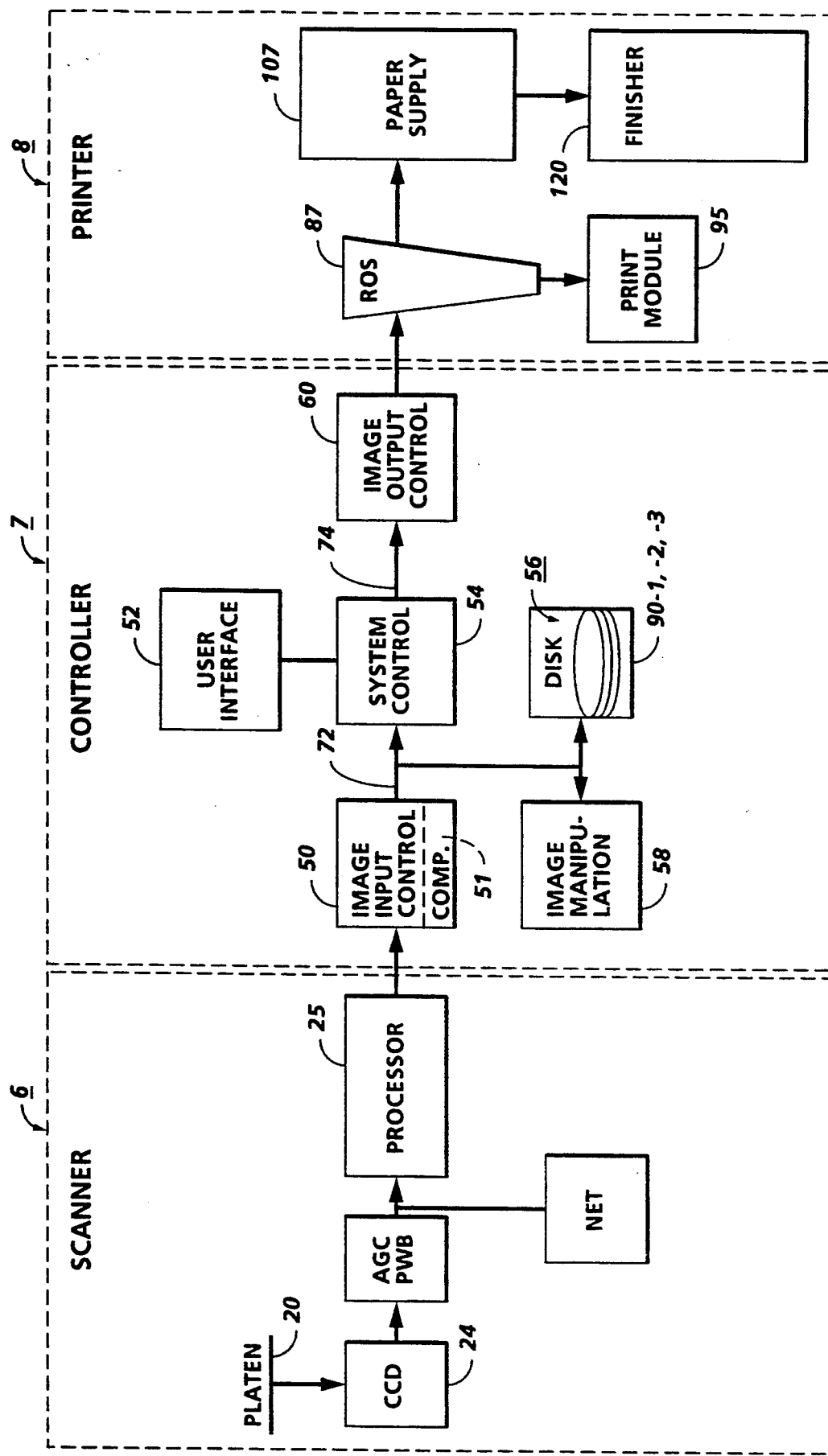
FIG. 2 is a block diagram depicting the major elements of the printing system shown in FIG. 1.

Referring to FIGS. 1 and 2, there is shown an exemplary laser based printing system (or imaging device) 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

For off-site image input, image input section 4 has a network 5 with a suitable communication channel, such as an ethernet connection, enabling image data, in the form of image signals or pixels, from one or more remote sources, to be input to system 2 for processing. Other remote sources of image data, such as streaming tape, floppy disk, video camera, etc. may be envisioned.

Figure 4:
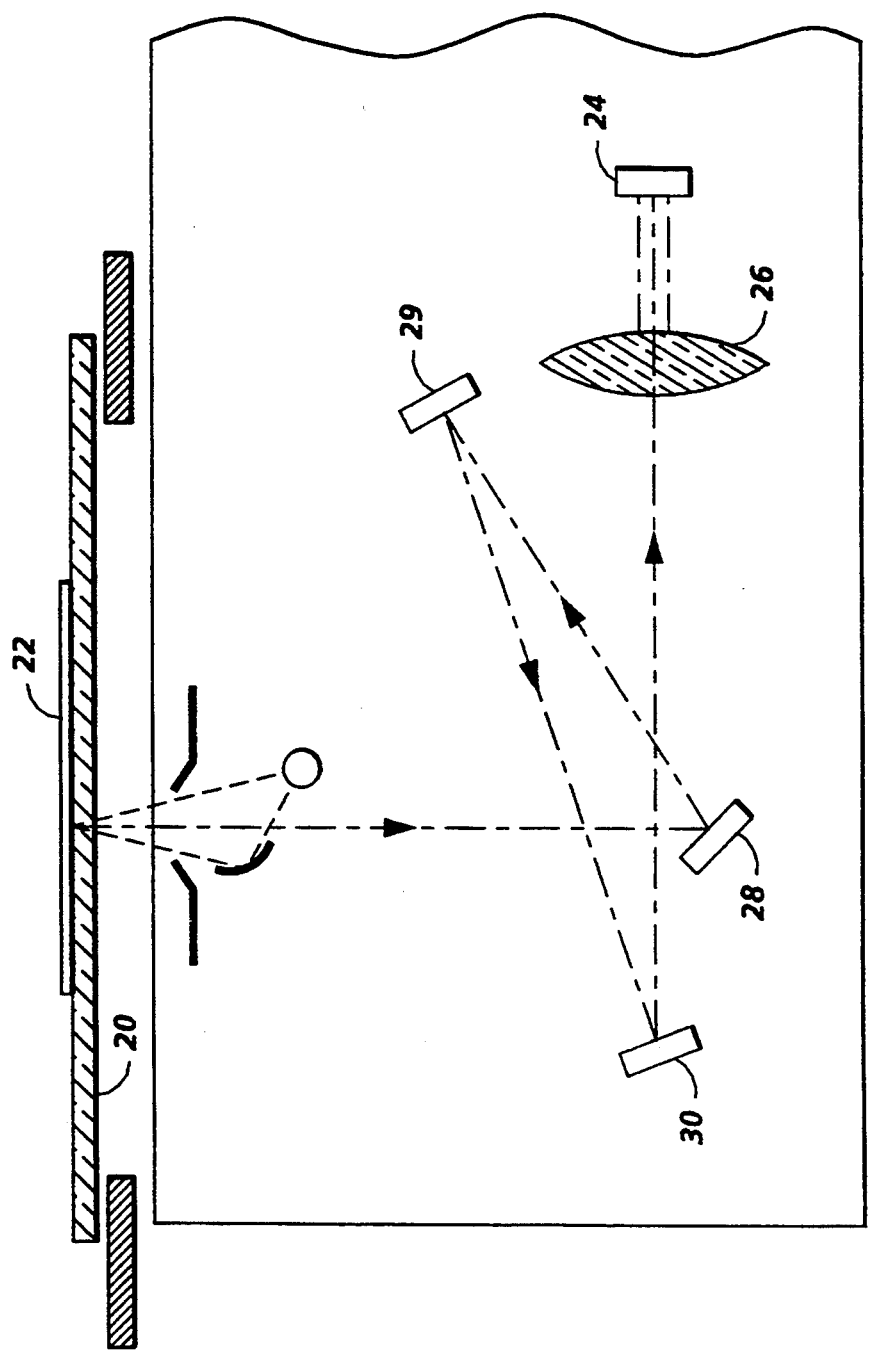
FIG. 4 is a schematic view showing certain construction details of a document scanner of the printing system shown in FIG. 1.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which, after suitable processing by processor 25, are output to controller section 7.

Processor 25 converts the analog image signals output by array 24 to digital image signals and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 42 onto platen 20 where the document is scanned by array 24. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply Section 107, and High Speed Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, to high speed finisher 120, or through bypass 180 to some other downstream finishing device, which could be a low speed finishing device such as a signature booklet maker (SBM) 200 of the type manufactured by Bourg AB. High speed finisher 120 includes a stitcher 122 for stitching or stapling the prints together to form books and thermal binder 124 for adhesively binding the prints into books.

Referring still to FIG. 3, the SBM 200 is coupled with the printing system 2, by way of a bypass 180, for receiving printed signatures. A sheet rotary 190 is positioned at an input of the SBM and the SBM includes three stations, namely a stitching station, a folding station and a trimming station, in which a plurality of signatures are processed. In operation, the signatures are transported through the bypass 180 to the sheet rotary 190 where the signatures are rotated, if necessary. The signatures are then introduced to the stitching station where the signatures are assembled as a stitched booklet. The stitched booklet is delivered to the folding station where it is preferably folded in half with a folding bar. At the trimming station, uneven edges of the folded signature set are trimmed with a cutting blade. Further details regarding the structure and function of the SBM 200 can be obtained by reference to U.S. Pat. No. 5,159,395 to Farrell et al.

Referring to FIGS. 1, 2 and 5, controller section 7 is, for explanation purposes, divided into an image input controller 50, User Interface(UI) 52, system controller 54, main memory 56, image manipulation section 58, and image output controller 60.

The scanned image data input from processor 25 of scanner section 6 to controller section 7 is compressed by image compressor/processor 51 of image output input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point a cursor to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decorepressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5-7, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 706 with image manipulation processors of image manipulation section 58; image generation processor PWBs 70-7, 70-8 with image generation processors 86 for processing the image data for printing by printing section 8; dispatch processor PWB 70-9 having dispatch processors 88, 89 for controlling transmission of data to and from printer section 8; and boot control-arbitration-scheduler PWB 70-10.

Referring particularly to FIG. 8, system control signals are distributed via a plurality of printed wiring boards (PWBs). These include EDN (electronic data node) core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

A Stepper Motor Input Output Controller (SMIOC) Printed Wiring Board Assembly (PWBA) is included when the printing system is used with an SBM. The SMIOC PWBA controls the operation of a sheet rotator which may be required when using the SBM. The SMIOC PWBA also handles the exporting of control signals from the printer to the SBM and monitors the status lines from the SBM. The SBM has two status lines whose status is either high or low. The status lines respectively indicate whether the SBM is ready and whether the SBM (output stacking tray) is full.

On machine power up, the Operating System software is loaded from memory 56 to EDN core PWB 130 and from there to remaining core PWBs 132, 134, 136 via bus 140, each core PWB 130, 132, 134, 136 having a boot ROM 147 for controlling downloading of Operating System software to PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Referring to FIG. 9, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Referring to FIG. 10, to print one of jobs 164a-164e, the job is moved into a print queue 166. A PRINTER QUEUE icon 168 on touchscreen 62, when actuated, displays the current print queue with a list of the jobs in the queue on touchscreen 62, an example of which is shown in FIG. 10. Each job in print queue 166 has a descriptor identifying the job, job number, quantity to be printed, paper color, finishing type, etc. Print queue 166 is ordered by priority and time of arrival of the job in the print queue. Other priority orderings may by envisioned. As illustrated in FIG. 10, the jobs in the print queue can have, among other sources, the scanner 6 or the network 5. Each scan job is shown as a set with a plain top sheet while each network job is shown as a set with a top sheet having a schematic network pattern thereon.

In one embodiment, the printing system 2 is a DocuTech ® Network Printing System ("Network Printer") which prints jobs transmitted from a workstation (not shown) by way of the network connection 5 (FIG. 2). The Network Printer processes network jobs written in a page description language ("PDL") known as "Interpress" and as a prerequisite to printing the network job, the Network Printer decomposes the job from a high level primitive form to a lower level primitive form.

The decomposition process is discussed in further detail in U.S. application Ser. No. 07/898,761 entitled "Apparatus and Method for Multi-Stage/Multi-Process Decomposing", filed on Jun. 12, 1992, by Bonk et al., the pertinent portions of which are incorporated herein by reference. In another embodiment the Network Printer is used, in conjunction with a DocuTech® Network Server, to print jobs written in, among other PDLs, Postscript®. The structure and operation of the DocuTech® Network Server may be more fully comprehended by reference to U.S. Pat. No. 5,226,112 to Mensing et al., the pertinent portions of which are incorporated herein by reference. Decomposed jobs are commonly stored, for output, in a job file (not shown) of the Network Printer and later transferred to the print queue 166 for printing. As discussed in further detail below there can be delays associated with printing network jobs.

FIG. 11 is a plan view illustrating the duplex and simplex paper paths through which sheets are conveyed in the system of FIG. 3. In FIG. 11, the path through which a sheet travels during duplex imaging is illustrated by the arrowed solid lines, whereas the path through which a sheet to be simplex imaged travels is illustrated by the arrowed broken lines. After an appropriately sized sheet is supplied from one of feed trays 110, 112 or 114, the sheet is conveyed past image transfer station 106 to receive an image. The sheet then passes through fuser 116 where the image is permanently fixed or fused to the sheet. After passing through rollers 172, gates (not shown) either allow the sheet to move directly to a final destination (e.g., tray 118, high speed finisher 120, SBM 200), or deflects the sheet into single sheet inverter 170. If the sheet is either a simplex sheet or a duplex sheet having completed side one and side two images formed thereon, the sheet will be conveyed directly to its final destination. If the sheet is a duplex sheet printed only with a side one image, the gate will deflect the sheet into inverter 170, where the sheet will be inverted and then fed to belt 174 for recirculation past transfer station 106 and fuser 116 for receiving and permanently fixing the side two image to the backside of the sheet. Examples of single sheet inverters usable with the present invention are disclosed in U.S. Pat. Nos. 4,918,490; 4,935,786; 4,934,681; and 4,453,841, the disclosures of which are herein incorporated by reference.

Unlike some previously designed duplex paper feed paths, the illustrated embodiment includes a single sheet inverter and no duplex buffer tray. For a given paper path length, the duplex paper path architecture of the illustrated embodiment offers a shorter duplex loop time because there is no sheet settling time nor sheet reacquisition time which is typically required with duplex architectures having a buffer tray therein. The absence of sheet buffering for the illustrated architecture decreases the size of the duplex sheet tracking buffers in the IOT control system and reduces the maximum number of duplex path purge sheets. By eliminating buffering and reacquisition of sheets, this architecture eliminates the job integrity problems associated with delayed detection of duplex tray multifeeds. That is, since systems having duplex buffer trays therein frequently lead to job integrity problems due to more than one sheet being unintentionally fed from the buffer tray at a time, the elimination of the buffer tray eliminates this problem. Additionally, since less sheets exist in the duplex paper path at a time than when a buffer tray is employed, the controller which controls the imaging process need keep track of fewer copy sheets at a time. The single sheet inverter and duplex paper path employed in the illustrated example is capable of handling sheets ranging in width from 8 to 17 inches and ranging in length from 10 to 14.33 inches.

As defined herein, the width of a sheet for purposes of the copy sheet paper path is the length of the edge of that sheet which is parallel to the direction in which copy sheets are fed through the paper path (the process direction). Thus, as will be described below, since smaller ($8 \times 11$ inch) sheets are fed with their long edge (the 11 inch edge) first, their "width" in the paper path is $8\frac{1}{2}$ inches. Since large sheets such as $11 \times 17$ inch sheets are fed with their short edge (the 11 inch edge) first, their width in the paper path is 17 inches.

The control of all machine functions, including all sheet feeding, is, conventionally, by a machine controller. The controller is preferably a known programmable microprocessor system, as exemplified by extensive prior art, e.g., U.S. Pat. No. 4,475,156 and its references. Plural but interconnecting microprocessors, as shown in FIGS. 5–7, may also be used at different locations. The controller conventionally controls all the machine steps and functions described herein, and others, including the operation of the document feeder, all the document and copy sheet deflectors or gates, the sheet feeder drives, the downstream finishing devices 120, 200, etc. As further taught in the references, the controller also conventionally provides for storage and comparison of the counts of the copy sheets, the number of documents recirculated in a document set, the desired number of copy sets and other selections and controls by the operator through the console or other panel of switches connected to the controller, etc. The controller is also programmed for time delays, jam correction, etc. Conventional path sensors or switches may be utilized to help keep track of the position of the documents and the copy sheets and the moving components of the apparatus by connection to the controller. In addition, the controller variably regulates the various positions of the gates depending upon which mode of operation is selected.

The presently disclosed embodiment exploits the sheet scheduling techniques of U.S. Pat. Nos. 5,095,342 and 5,159,395. In particular, marking software is employed, in conjunction with one or more controllers, to implement the present sheet scheduling technique. The controllers which control the sheet scheduling described in the present application are Image Output Control 60 and EDN Core 130 of FIGS. 2 and 8, respectively. The majority of the sheet scheduling functions are performed by the EDN Core 130. The Image Output 60 is responsible for converting simplex sheets to duplex with blank back sides. The reason for this difference in responsibility is that the controller 7 needs to know the plex of all sheets to prepare the images correctly. Of course, other controller structures are possible depending on the hardware and software used to implement the present embodiment.

The functionality of the marking software is discussed, in some detail, in U.S. Patent application Ser. No. 08/010,104, to Hammer et al., entitled "Apparatus and Method for Managing Memory in a Printing System" and filed Jan. 28, 1993, the pertinent portions of which are incorporated herein by reference. As discussed in the '104 Application, with the marking software, the time at which each stored image is to be fed to the photoreceptor 98 (FIG. 3) is designated in a list or table, in advance of marking. As printing proceeds, the scheduling controller refers to the list or table for determining which image should be fetched from disk (FIG. 2), and transmitted to the system memory 61 (FIG. 5), for processing by one of the image generator processors 86. During the scheduling process the scheduling controller may generate gaps (defined by one or more unused pitches) between a set or a job. Moreover, pitches may be intentionally scheduled within the printing of a single set. For example, as discussed in U.S. Pat. No. 5,159,395, in one mode of operation it is preferable to interleaf a pitch between two adjacent sheets on the photoreceptor to facilitate the finishing of multiple sets produced from a stored job.

Referring to FIG. 12, an exemplary scheduling arrangement which reduces the need to interleaf pitches, and thus increases the productivity of the printer, i.e. the productivity of marking engine, is disclosed. In the following discussion of the exemplary scheduling arrangement, the term "scheduling" is used to designate the process of corresponding sheets to be marked with available pitches. As will be appreciated by those skilled in the art, scheduling a job in an electronic printing system, such as the DocuTech® printing system, results in one or more sets being marked, with the marking engine of FIG. 3, and delivered to a specified print output area, during the time interval(s) scheduled with the method described below. To provide a comprehensive view of the method of the preferred embodiment, an example, referred to as "present example" is interspersed throughout the current description. At step 201, Job J, job 164a in the present example (FIG. 10), is designated as being ready for printing. Job J or job 164a is designated as the first job, i.e. J=1 (step 202), while jobs 164b–164e are designated as jobs 2 through 5, respectively. To ready Job J or job 164a for printing (step 204), the programming data for the lth sheet is acquired. In the present example, no delay is required for job 164a (step 206) so the process proceeds to a scheduling step 208 (FIG. 14) and scheduling of the sheets for the job proceeds, by way of steps 210 and 212, until the Job J has been scheduled completely.

After Job J has been scheduled completely, the value of J is incremented, at step 214 so that the next job in the print queue can be scheduled. Under certain circumstance, the print queue may be empty. Accordingly, a check is performed at step 216 to determine if there is a "next job" in the print queue. If the next job is a partially scheduled job (steps 218, 220), then the scheduling is begun at a point within the job. That is, as will appear below, I varies as a function of a value equaling a last scheduled sheet in a candidate job (referred to below as Job C). If, on the other hand, the next job is an unscheduled job (steps 218, 222), then I is set to the value of 1. In the present example, step 214 corresponds to moving the scheduling process to job 164b in the print queue 166. Additionally, since job 164b is an unscheduled job, the value of l is set at 1. In response to executing step 220 or 222, the process loops back to step 204.

During the scheduling of job 164b, a delay, dictated by the destination of job 164b, will be encountered. That is, since job 164b is a multi-set job, whose sets are to be bound, a delay will arise after a predetermined number of sets have been transmitted to the finisher 120. In order to optimize printing during the delay created by finishing, the printing system 10, in accordance with the method of the disclosed embodiment, preferably schedules at least a part of a candidate job to be printed during the delay, provided the printing of the candidate job part can be achieved in a timely manner and the candidate job part can be transmitted to an output destination other than the one being employed forfinishing.

Prior to scheduling the candidate job, it is determined, at step 226, the extent of a delay duration ("D1") that will arise as a result of one or more finishing operations to Job J. As Job J is scheduled for marking, a gap in time, representative of D1, will occur. By reference to the gap, the software is able to determine the magnitude of D1. Next, at step 228, the process locates the first job in the print queue, other than Job J, scheduled to be printed and delivered to a location other than the location to which Job J is to be delivered. In the present example, job 164c is a suitable candidate, since it is destined for the SBM 200, so the process proceeds to step 230. As will be apparent from the discussion below, while step 230 need not be performed when I=1 and J=1, the step serves as a returning point so that the process can be repeated as additional delays in the scheduling of Job J arise. In the present example, a suitable candidate is present. If a suitable candidate had not been present, however, then an appropriate number of pitches would have been skipped (via steps 206, 226, 228 and 232) until the delay, created by the finishing process, expired.

Continuing with the present example, after at least a portion of job 164b has been scheduled, job 164b is, via step 234, designated as job C and selected as the next job in the print queue with an alternative destination. At step 236, it is determined whether the destination of the candidate job is ready. As will be understood, by reference to FIG. 9, the destination of each job is programmed originally with the aid of the job ticket 150, at the "job level". If the destination is not ready, then, as indicated by step 238, the process is routed to decision step 230 to determine if any more candidate jobs remain. In the present example, job 164b remains in the print queue 166 and the SBM 200 is ready, so, at step 239, corresponding job transition delays, i.e. D2 and D3, are determined. Preferably, D2 and D3 include the time required to set up the photoreceptor for the Job C and the time required to reset the photoreceptor for Job J, respectively. Setting up of the photoreceptor, in one example, constitutes changing the pitch mode of the photoreceptor to accommodate for the particular stock of a job.

To determine if it is feasible to schedule Job C, the value of D 1, determined at step 226 (FIG. 12) is, by way of step 240, compared to the sum of D2 and D3. If the sum of D2 and D3 is greater than D1, then the current candidate is abandoned (step 238) and the process loops back to step 230 to check for remaining candidate jobs. On the other hand, if the sum of D2 and D3 is less than D1, then, via step 242, the scheduling of Job C is started or continued, whichever the case may be. At one moment in time, the scheduling of Job C is started at the first sheet of Job C, but if several delays are encountered in Job J, due to, for example, the finishing of multiple sets of Job J, then scheduling of Job C may be stopped, temporarily, and continued several times.

As scheduling proceeds, the magnitude of D1 will decrease and, as implied by step 244, there will, eventually, be a demand to switch from Job C to Job J, if the time required to switch from Job C to Job J, i.e. D3, is greater than or equal to D1. If D3 is less than D1, then scheduling continues for Job C with the magnitude of D1 being redetermined at step 246. If D3 is greater than or equal to D1, then, as indicated at step 247, a value corresponding to the last sheet scheduled for Job C, namely K, is stored in memory and the scheduling of Job J is resumed. After a selected number of sheets have been scheduled for Job J, the process will look to step 206 for determining if further sheet interleaving is required as a result of delay(es) in Job J.

It follows from the discussion above that the process of FIGS. 12–14 can proceed to an unscheduled Job J prior to completing the scheduling of a partially scheduled Job J. In another embodiment, the scheduling of a partially scheduled Job J would be completed prior to proceeding to a next unscheduled Job J. An advantage of this other embodiment is that it would result in the clearing of the output area associated with the partially scheduled Job J and it would reduce job tracking complexity.

Additionally, while the discussion above relates to delays in scheduling due to finishing, delays can arise as a result of other events. Two examples of such events may be encountered in a printing system. In a first example, a delay is created by a start-up time of a vacuum blower (not shown), the vacuum blower being preferably associated with the paper feeder 110 of FIG. 3. That is, when the feeder 110 is to be employed, a signal is transmitted to the feeder and the vacuum blower is turned on. In the time that it takes the blower to "get up to speed", a delay, in which sheets from the candidate job can be scheduled, in accordance with the above-disclosed method, is generated. In the second example, a delay is created as a result of formatting a network job. Referring to FIG. 10, it will be noted that job 164c is a network job. As will be appreciated by those skilled in the art, a network job may not necessarily stored in a form that permits it to be printed as soon as it is called up from the print queue. More particularly, in certain known printing systems, several pitches may pass by before the network job is suitably formatted for printing. Several sheets of a candidate job can be scheduled for printing during this delay of the network job. Regarding scheduling in the first example, the marking software can determine the magnitude of the delay because the delay caused by the blower is constant over time. On the other hand, the delay encountered in printing network jobs may vary form job to job. Accordingly, for network jobs, a nominal value of D1 is set and scheduling of a suitable candidate job proceeds (FIG. 13) as long as D3 is less than D1.

Numerous features of the above-disclosed embodiment will be appreciated by those skilled in the art. One feature of the disclosed embodiment is that it reduces productivity losses typically encountered in the marking engine. That is, typically, since the finishing process lags substantially behind the printing processing, delays are generated, i.e. the finishing process creates a "bottleneck". By printing parts of an alternative job during such delays, the printing system achieves relatively high levels of productivity. Another feature of the disclosed embodiment is that it promotes a high degree of flexibility. More particularly, the above-mentioned productivity can be obtained without modifying the hardware of the printing system since the present technique is equally effective with many different types of finishing devices having a variety of manufacturing sources. Yet another feature of the disclosed embodiment is that it achieves its goal of increasing productivity without inconveniencing the user of the printing system. In particular, there is no way for the user to know that an alternative job is being processed while his/her job is being processed. As far as the user is concerned, his/her job is completed in a seamless manner. This seamless appearance is a result of the method in that printing of the user's job is only delayed as long as necessary to coordinate the finishing of a first part of the user's job with the printing of a second part of the user's job.

What is claimed is:

1. A printing system with a marking engine, for producing prints, and a finishing device, operatively coupled with the marking engine, for performing a finishing operation on prints produced with the marking engine, wherein the marking engine normally experiences productivity losses as a result of the performance of the finishing operation, said printing system comprising:

memory for storing a first print job and a second print job;

a print output area, different from the finishing device and operatively coupled with the marking engine, for alternatively receiving prints produced by the marking engine; and a controller, communicating with said memory and the marking engine, for causing a printed first portion of the first print job to be transmitted to the finishing device during a first time interval and a printed portion of the second print job to be transmitted to said print output area during a second time interval, the finishing operation being performed on the printed first portion of the first print job during the second time interval and a second portion of the first print job being delivered to the marking engine, during the finishing operation on the printed first portion of the first print job, to minimize the productivity losses normally experienced by the marking engine.

2. The printing system of claim 1, in which the finishing operation is performed for a selected time period, wherein the second time interval varies as a function of the selected time period.

3. The printing system of claim 1, wherein said print output area comprises an output tray.

4. The printing system of claim 1, wherein said print output area comprises a second finishing device.

5. A printing system with a marking engine, for producing prints, and a finishing device, operatively coupled with the marking engine, for performing a finishing operation on prints produced with the marking engine, wherein the marking engine normally experiences productivity losses as a result of the performance of the finishing operation, said printing system comprising:

memory for storing a first print job, a second print job and a third print job;

a print output area, different from the finishing device and operatively coupled with the marking engine, for alternatively receiving prints produced by the marking engine; and a controller, communicating with said memory and the marking engine, for causing a printed first portion of the first print job to be transmitted to the finishing device during a first time interval and a selected one of a printed portion of the second print job and a printed portion of the third print job to be transmitted to said print output area during a second time interval, the finishing operation being performed on the printed first portion of the first print job during the second time interval and a second portion of the first print job being delivered to the marking engine, during the finishing operation on the printed first portion of the first print job, to minimize the productivity losses normally experienced by the marking engine.

6. The printing system of claim 5, in which a transition delay is associated with producing the printed portion of the second print job, wherein the printed portion of the third print job is transmitted to said print output area when the transition delay is greater than a preselected time interval.

7. The printing system of claim 5, in which the finishing operation is performed for a selected time period, wherein the second time interval varies as a function of the selected time period.

8. The printing system of claim 5, wherein said print output area comprises an output tray.

9. The printing system of claim 5, wherein said print output area comprises a second finishing device.

10. A method for producing prints in a printing machine having a marking engine operatively coupled with a finishing device, wherein the finishing device performs a finishing operation on prints produced with the marking engine and the marking engine normally experiences productivity loses as a result of the performance of the finishing operation, comprising the steps of:

a) storing a first print job and a second print job;
  b) printing a first portion of the first print job;
  c) transmitting the printed first portion of the first print job to the finishing device;
  d) performing a finishing operation, at the finishing device, on the printed first portion of the first print job;
  e) during said step d), printing a portion of the second print job;
  f) transmitting the printed portion of the second print job to a print output area, the print output area being separate from the finishing device;
  g) initiating printing of a second portion of the first print job, concurrent with step d), for minimizing the productivity losses normally experienced by the marking engine; and
  h) printing any remaining portion of the second print job.

11. The method of claim 10, wherein said step f) comprises transmitting the printed portion of the second print job to an output tray.

12. The method of claim 10, wherein said step f) comprises transmitting the printed portion of the second print job to a second finishing device.

13. The method of claim 10, in which the printed portion of the second print job is printed during a printing time interval, further comprising the step of determining a delay time defined by a time interval occurring between said step b) and said step g), wherein the printing interval varies as a function of the delay time interval.

14. A method for producing prints in a printing machine having a marking engine operatively coupled with a finishing device, wherein the finishing device performs a finishing operation on prints produced with the marking engine and the marking engine normally experiences productivity loses as a result of the performance of the finishing operation, comprising the steps of:

a) storing a first print job, a second print job and a third print job;
  b) printing a first portion of the first print job;
  c) transmitting the printed first portion of the first print job to the finishing device;
  d) performing a finishing operation, at the finishing device, on the printed first portion of the first print job;
  e) during said step d), printing one of a portion of the second print job and a portion of the third print job;
  f) transmitting the one of the printed portion of the second print job and the printed portion of the third print job to a print output area, the print output area being separate from the finishing device;
  g) initiating printing of a second portion of the first print job, concurrent with step d), for minimizing the productivity losses normally experienced by the marking engine; and
  h) when said step e) includes printing a portion of the second print job, printing any remaining portion of the second print job, and when said step e) includes printing a portion of the third print job, printing any remaining portion of the third print job.

15. The method of claim 14, wherein said step f) comprises transmitting the selected one of the printed portion of the second print job and the printed portion of the third print job to an output tray.

16. The method of claim 14, wherein said step f) comprises transmitting the selected one of the printed portion of the second print job and the printed portion of the third print job to a second finishing device.

17. The method of claim 14, in which the selected one of the printed portion of the second print job and the printed portion of the third print job is printed during a printing time interval, further comprising the step of determining a delay time defined by a time interval occurring between said step b) and said step g), wherein the printing interval varies as a function of the delay time interval.

18. The method of claim 17, in which a job transition delay interval is generated as a result of printing the printed portion of the second job, further comprising the steps of:

prior to performing said step e), determining the job transition delay interval;
  comparing the job transition delay interval with the delay time interval; and
  printing the portion of the second print job, prior to printing the portion of the third print job, when the job transition delay interval is less than the delay time interval.

19. A method of producing prints in a printing machine having a controller communicating with a memory section, comprising the step of:

a) storing a first job and a second job in the memory section;
  b) transmitting a signal to the controller indicating that the first job will be ready for printing after a delay time interval occurs;
  c) printing a portion of the second job, during the delay time interval, when a preselected condition is met;
  d) when the delay time interval ends, printing at least a portion of the first job; and
  e) printing any remaining portion of the second job.

20. The method of claim 19, in which the delay time interval is represented by a first value, wherein:
  said step c) includes:

(1) determining a job transition delay interval associated with performing said step c), the job transition delay interval being represented by a second value, and (2) comparing the first value with the second value;

and the preselected condition of said step c) is met when the second value is less than the first value.

* * * * *